US009010770B2

(12) United States Patent
Cantrell

(10) Patent No.: US 9,010,770 B2
(45) Date of Patent: Apr. 21, 2015

(54) ADJUSTABLE CHASSIS SYSTEM

(71) Applicant: Brian Cantrell, Loganville, GA (US)

(72) Inventor: Brian Cantrell, Loganville, GA (US)

( * ) Notice: Subject to any disclaimer, the term of this patent is extended or adjusted under 35 U.S.C. 154(b) by 0 days.

(21) Appl. No.: 14/187,528

(22) Filed: Feb. 24, 2014

(65) Prior Publication Data
US 2014/0239605 A1    Aug. 28, 2014

Related U.S. Application Data

(60) Provisional application No. 61/770,297, filed on Feb. 27, 2013.

(51) Int. Cl.
*B62B 3/02* (2006.01)
*B60P 1/04* (2006.01)
*B62B 5/00* (2006.01)

(52) U.S. Cl.
CPC .................... *B62B 5/0083* (2013.01)

(58) Field of Classification Search
USPC ................. 280/638, 35, 639, 651, 656, 6.15, 280/6.154, 6.155, 6.157, 79.11
See application file for complete search history.

(56) References Cited

U.S. PATENT DOCUMENTS

| 2,907,575 | A |   | 10/1959 | Locker |  |
|---|---|---|---|---|---|
| 3,434,733 | A |   | 3/1969 | Hume |  |
| 3,964,762 | A | * | 6/1976 | Adams | 280/639 |
| 5,086,847 | A |   | 2/1992 | Meiners |  |
| 5,820,150 | A |   | 10/1998 | Archer et al. |  |
| 5,867,970 | A |   | 2/1999 | Ehrhart et al. |  |
| 6,041,584 | A |   | 3/2000 | Hohn |  |
| 6,131,919 | A | * | 10/2000 | Lee et al. | 280/6.154 |
| 6,367,823 | B1 |   | 4/2002 | Miyagi |  |
| 7,530,582 | B2 |   | 5/2009 | Truchsess et al. |  |
| 7,762,566 | B2 | * | 7/2010 | Wang | 280/79.7 |
| 8,567,795 | B2 | * | 10/2013 | Megens | 280/35 |
| 2003/0025287 | A1 | * | 2/2003 | Kady | 280/47.29 |
| 2007/0001431 | A1 |   | 1/2007 | Fiorini |  |
| 2010/0308563 | A1 |   | 12/2010 | Martin |  |
| 2011/0083866 | A1 |   | 4/2011 | Notaras et al. |  |

* cited by examiner

*Primary Examiner* — John Walters
(74) *Attorney, Agent, or Firm* — Smith Risley Tempel Santos LLC; Matthew T. Hoots

(57) ABSTRACT

Various embodiments, aspects and features of the present invention encompass a system and method for an adjustable chassis system ("ACS") that may be removably fixed to a payload object so that transport of the object across rough or uneven terrain is made less burdensome. Notably, some embodiments of an ACS may be integral to a given payload object. Certain embodiments of an adjustable chassis system advantageously do not include axles, yet may be raised or lowered to adjust ground clearance of the chassis and payload object. Moreover, certain embodiments of an ACS may be easily disassembled or collapsed for compact storage. Yet another advantage of certain ACS embodiments is that, by virtue of the independent side-to-side height adjustment, a payload object carried by the ACS may serve as a level seat or work surface over inclined or uneven ground.

20 Claims, 11 Drawing Sheets

ADJUSTABLE CHASSIS SYSTEM

CROSS-REFERENCE TO RELATED APPLICATIONS

Priority under 35 U.S.C. §119(e) is claimed to the U.S. provisional application entitled "ADJUSTABLE CHASSIS SYSTEM AND METHOD," filed on Feb. 27, 2013 and assigned application Ser. No. 61/770,297, the entire contents of which are hereby incorporated by reference.

BACKGROUND

The present solution relates to transport systems and, more particularly, to an adjustable chassis system for retrofit to a container or other equipment. Outdoorsmen, fans attending sporting events or musical concerts, beachgoers and others often have need to carry portable ice chests (i.e., "coolers") and/or gear containers. Laden with ice, food, drinks, supplies, etc., it can be a significant physical burden to tote a full cooler or container to a destination such as a campsite or beach.

Consequently, some coolers and gear containers have integrated wheels to ease the burden of transport, although the integrated wheels do little to provide ground clearance. As such, a user pulling a cooler or gear container with integrated wheels may find that half the time he is just dragging the cooler or gear container over rough terrain and obstacles. Other solutions in the prior art are to simply load a wheelbarrow or wagon with the cooler or gear container. Although a wheelbarrow or wagon may provide enough ground clearance for easy transportation of its contents across rough terrain, a wheelbarrow or wagon is cumbersome to store.

Therefore, there is a need in the art for an adjustable chassis system that may be removably fixed to a cooler, gear container or other equipment so that transport across rough terrain is made less burdensome. Moreover, what is needed in the art is an adjustable chassis system that does not require axles and may be raised or lowered to adjust ground clearance of its payload. Further, what is needed in the art is an adjustable chassis system that may be easily disassembled or collapsed for compact storage. Additionally, because users of coolers and gear containers often desire for their coolers and containers to serve double duty as a "chair" or "seat" once at the destination, there is a need in the art for an adjustable chassis system that may level its payload over uneven ground.

SUMMARY OF THE DISCLOSURE

Various embodiments, aspects and features of the present invention encompass a system and method for an adjustable chassis system ("ACS") that may be removably fixed to a payload object so that transport of the object across rough or uneven terrain is made less burdensome. Notably, some embodiments of an ACS may be integral to a given payload object. Certain embodiments of an adjustable chassis system advantageously do not include axles, yet may be raised or lowered to adjust ground clearance of the chassis and payload object. Moreover, certain embodiments of an ACS may be easily disassembled or collapsed for compact storage. Yet another advantage of certain ACS embodiments is that, by virtue of the independent side-to-side height adjustment, a payload object carried by the ACS may serve as a level seat or work surface over inclined or uneven ground.

An exemplary ACS configured to removably receive a payload object comprises a connector plate, a left-side frame bracket, a right-side frame bracket, a pair of left-side rotating arms with wheels and a pair of right-side rotating arms with wheels. The frame brackets are adjustably mounted to the connector plate such that a variable width is defined by the left-side frame bracket and right-side frame bracket. The payload object may be removably secured within the defined width between the brackets. The pair of left-side rotating arms are adjustably mounted to the left-side frame bracket and, similarly, the pair of right-side rotating arms are adjustably mounted to the right-side frame bracket. Independent left-side and right-side vertical adjustment means in the respective frame brackets provide for independent adjustment of left and right ground clearance heights of the ACS.

BRIEF DESCRIPTION OF THE DRAWINGS

In the drawings, like reference numerals refer to like parts throughout the various views unless otherwise indicated. For reference numerals with letter character designations such as "10L" or "10R", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
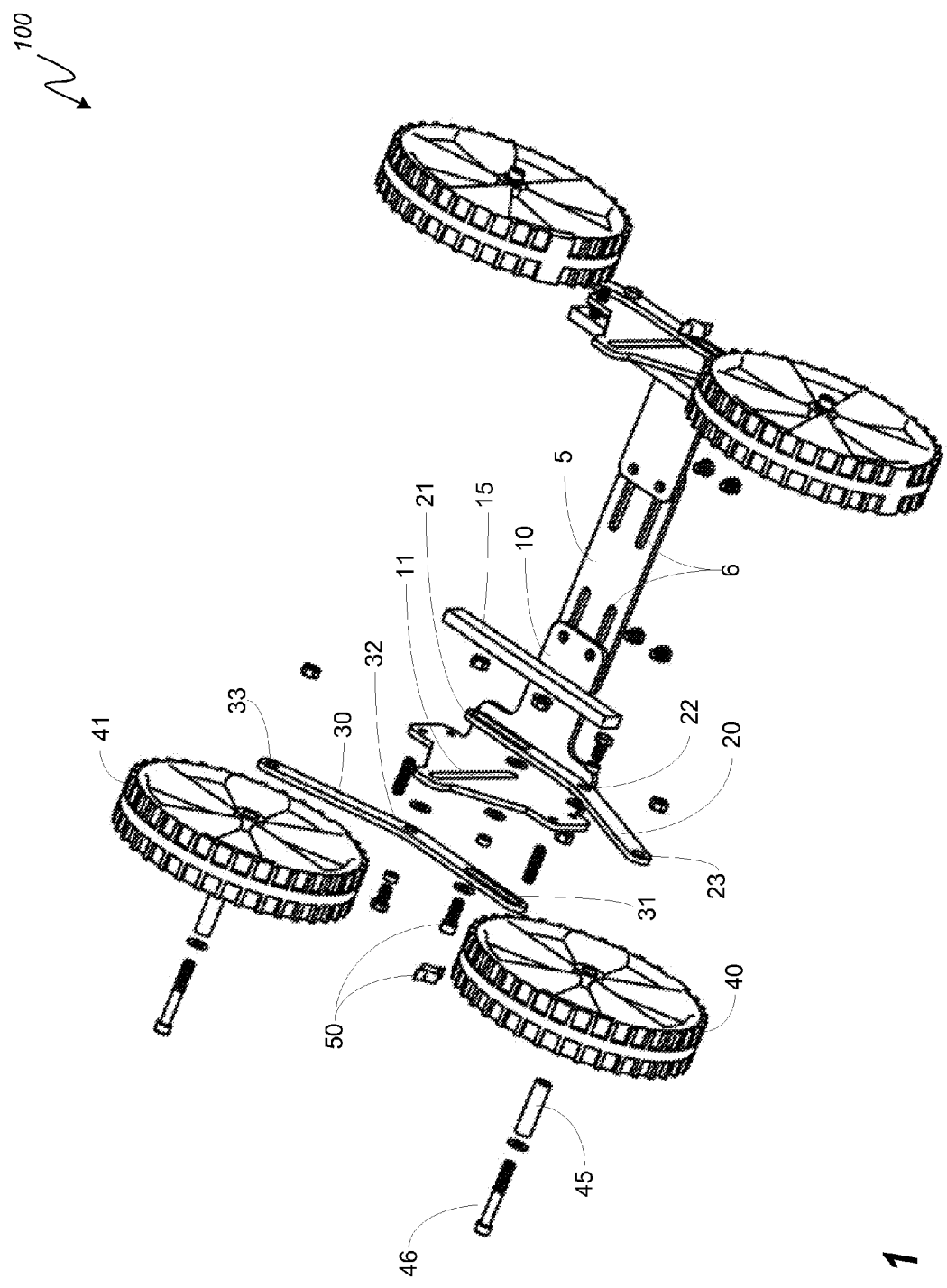
FIG. 1 is an exploded perspective view of an exemplary embodiment of an adjustable chassis system ("ACS")

The word "exemplary" is used herein to mean "serving as an example, instance, or illustration." Any aspect described herein as "exemplary" is not necessarily to be construed as exclusive, preferred or advantageous over other aspects.

In this description, the term "payload," "payload object," "payload device" and the like is used to reference any device or equipment that may be removably attached, or permanently integrated to (depending on embodiment), an adjustable chassis system. Examples of envisioned payload objects include, but are not limited to, an ice chest or cooler, a gear container, a truck box, a worksite locker, a johnboat, a canoe, a skid, an open-topped box or plastic bin, etc.

In this description, labels such as "left-side," "right-side," "inner," "outer" and the like are used for the purpose of orientating the reader and are not meant to suggest that certain aspects or features of the solutions must be located on a "left-side" or a "right-side" or "inside" a certain other component or "outside" a certain other component. Moreover, as one of ordinary skill in the art would understand, what is, or is not, a "left-side" or "right-side" of a given device, or "inside" one component or "outside" another component, is inherently defined by the beholder. As such, it will be understood that, for example, what is described herein to be located on a "left-side" or "right-side" may be located on a "front-side" or "back-side" of an alternative embodiment. It will also be understood that, for example, a component located in the system such that it is "inside" or "outside" relative to a given other component may be located "inside" or "outside" relative to a different other component in a different embodiment of the system.

The presently disclosed embodiments, as well as features and aspects thereof, are directed towards providing a system and method for an adjustable chassis system ("ACS") that may be removably fixed to a payload object so that transport of the object across rough or uneven terrain is made less burdensome. Certain embodiments of an adjustable chassis system advantageously do not include axles, yet may be raised or lowered to adjust ground clearance of the chassis and payload object. Moreover, certain embodiments of an ACS may be easily disassembled or collapsed for compact storage. Yet another advantage of certain ACS embodiments is that, by virtue of the independent side-to-side height adjustment, a payload object carried by the ACS may serve as a level seat or work surface over inclined or uneven ground.

Exemplary embodiments of an ACS system are disclosed herein in the context of transporting a payload object in the form of an ice chest or "cooler" to a campsite; however, one of ordinary skill in the art will understand that various embodiments may also comprise any combination of features and aspects useful for other payload object transport applications related to, but not limited to, tailgating, concert attendance, a day at the beach, fishing, hunting, worksite applications, etc. That is, it will be understood that, an ACS solution may be configured to receive, or be an integrated part of, any payload object in need of transport. As such, the depictions and descriptions herein of embodiments specifically configured for transport of payload objects in the form of a cooler will not be interpreted to limit the scope of an ACS solution.

Certain embodiments of an ACS may be constructed of powder coated carbon steel, although embodiments of an ACS are not limited by materials of construction as it is envisioned that an ACS may be constructed from any suitable material or combination of materials including, but not limited to, aluminum, aluminum alloy, stainless steel, poly vinyl chloride ("PVC"), etc.

An exemplary embodiment of an adjustable chassis system ("ACS") may be configured to accommodate a payload object in the form of a cooler. Because coolers are often heavy and cumbersome when loaded with ice and other things, it is common for two people to have to work together to transport the cooler from one location to another. Advantageously, by attaching an ACS embodiment to a cooler, a single person may be able to relocate the cooler even when it is loaded. Moreover, because an ACS embodiment may be operable to adjust its ground clearance, once secured to the ACS the cooler may be raised such that it is easily transported across rough terrain or lowered such that it maintains a low profile.

It is a further advantage of ACS embodiments that axles are not necessary, thereby alleviating a common component in the prior art that presents an obstacle to optimized ground clearance. Additionally, it is an advantage of ACS embodiments that the "left" and "right" sides, each side including a single wheel or a pair of "front" and "back" wheels depending on embodiment, may be raised or lowered independently from the opposite side. Notably, because the left and right sides of an ACS embodiment may be raised or lowered independent from the opposite side, a payload object such as a cooler may be leveled relative to the ground. Further, although a 2-wheeled (single left wheel and single right wheel) embodiment of an ACS is not specifically depicted in the drawings, one of ordinary skill in the art would understand from the present disclosure that ACS embodiments with two wheels, as opposed to four, are envisioned. As will be more easily understood from the description of the Figures that follows, a two-wheeled embodiment of an ACS may require only a single "left-side" rotating arm and a single "right-side" rotating arm, as opposed to the left-side and right-side pairs depicted in the exemplary embodiments.

FIG. 1 is an exploded perspective view of an exemplary embodiment of an adjustable chassis system ("ACS") 100. As can be seen in the FIG. 1 illustration, the exemplary ACS 100 embodiment is symmetrical such that a "left" side contains substantially identical components to a "right" side. Consequently, for simplicity's sake only a single "side" of the exemplary ACS 100 embodiment is labeled and described relative to the FIG. 1 illustration.

In the exemplary embodiment 100, a connector plate 5 may include a series of lateral positioning slots 6 for adjustably receiving a frame bracket 10. The frame bracket(s) 10 may be adjusted on the connector plate relative to one another such that a width is defined between the frame bracket(s) 10. As will become clear from a review of subsequent drawings, the coarse lateral adjustability of the frame bracket(s) 10 serve to accommodate different widths of payload objects. A payload object, once placed within the coarse width defined by the adjusted frame bracket(s) 10, may be secured in place by a fine adjustment of the tightening bar(s) 15. The tightening bar(s) 15 may be adjusted by set screws 24, or some other adjustment means such as, but not limited to, spring-loaded pins, ratcheting mechanisms, etc. Once the tightening bar(s) 15 are finely adjusted to snugly interface with a payload object, the payload object may be adequately secured to the ACS 100. It is envisioned that the tightening bar(s) 15 may include a VELCRO strip, a high friction surface area, or some other means for providing additional security to mitigate slippage or physical damage to the payload object.

Notably, although the present exemplary embodiment 100 is shown and described as a stand-alone system operable to securely and removably receive a payload object, it will be understood that an ACS is not limited to embodiments that are independent of a payload object; i.e., it is envisioned that certain embodiments of an ACS may be integrated within a payload object and not configured to be easily disconnected from the payload object.

Returning to the FIG. 1 illustration, it can be seen that the frame bracket 10 includes a vertical positioning slot 11. An inner rotating arm 20 is juxtaposed to the inside of the frame bracket 10 and an outer rotating arm 30 is juxtaposed to the outside of the frame bracket. The inner rotating arm 20 includes an inner arm positioning slot 21, an inner arm pivot connection 22 and a rear wheel connection 23. Similarly, the outer rotating arm 30 includes an outer arm positioning slot 31, an outer arm pivot connection 32 and a front wheel connection 33.

As can be seen from the FIG. 1 illustration, the inner rotating arm 20 and the outer rotating arm 30 are each mechanically connected to the frame bracket 10 by virtue of bolts or pins inserted through pivot connections 22, 32 at the opposite lower corners of the vertical portion of the frame bracket 10. In this way, the bolts and pivot connections 22, 32 work to create pivot points about which the rotating arms 20, 30 may be rotated, as one of ordinary skill in the art of mechanics would understand. Notably, each of the inner rotating arm 20 and the outer rotating arm 30 are also mechanically and adjustably connected to the frame bracket 10 by virtue of a vertical positioning mechanism 50 inserted through the outer arm positioning slot 31, the vertical positioning slot 11 of the frame bracket 10, and the inner arm positioning slot 21. At one distal end of the inner rotating arm 20, a rear wheel 40 is connected to a rear wheel connection 23 by an exemplary arrangement that includes a pin 46 and bushing 45. Similarly, at a distal end of the outer rotating arm 30, a front wheel 41 is connected to a front wheel connection 33.

Advantageously, as one of ordinary skill in the art of mechanics would understand from the FIG. 1 illustration and description (and subsequent Figures and descriptions), a user of the exemplary ACS 100 may actuate the vertical positioning mechanism 50 up and/or down along a vertical path defined by the vertical positioning slot 11 of the frame bracket 10. As the vertical positioning mechanism 50 is actuated up or down the vertical positioning slot 11, the vertical positioning mechanism 50 may simultaneously slide within the inner and outer arm positioning slots 21, 31 such that the inner rotating arm 20 and the outer rotating arm 30 rotate around the pivot connections 22, 32. In doing so, the side of the ACS 100 that corresponds to the vertical positioning mechanism 50 will raise or lower relative to the ground, thereby also raising or lowering the side of a payload object (not shown in FIG. 1) that corresponds to the vertical positioning mechanism 50. Notably, although the exemplary embodiment 100 is depicted with a vertical positioning slot 11, an ACS 100 is not limited to a vertical positioning aspect that includes a vertical positioning slot 11 as it is envisioned that some embodiments may include a series of vertically aligned holes configured to receive the vertical positioning mechanism 50.

Figure 2A:
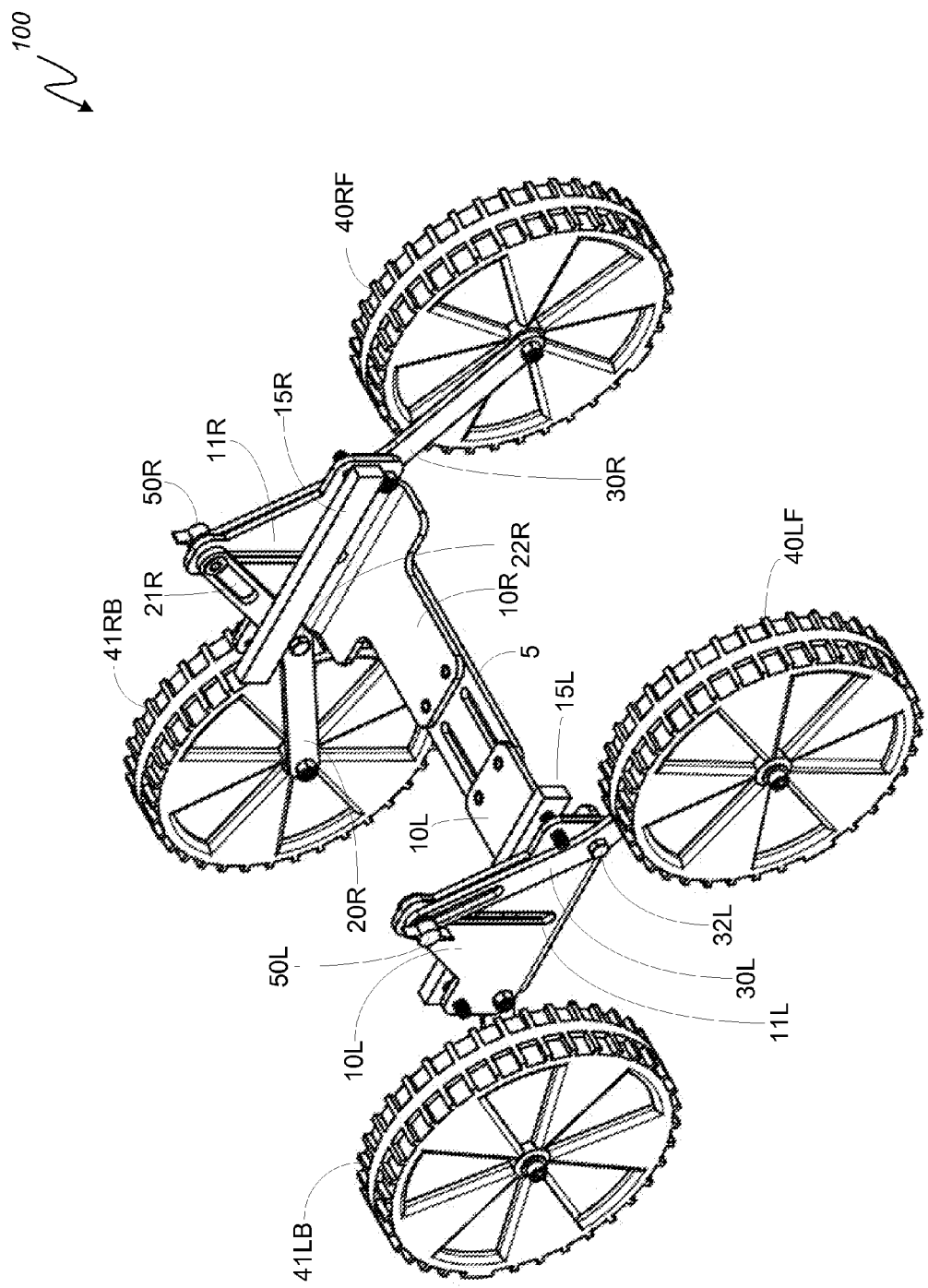
FIG. 2A is a perspective view of the exemplary embodiment of an ACS depicted in FIG. 1, shown assembled and in a raised position.

FIG. 2A is a perspective view of the exemplary embodiment of an ACS 100 depicted in FIG. 1, shown assembled and in a raised position relative to the ground. From the FIG. 2A illustration, it can be seen that both the left vertical positioning mechanism 50L and the right vertical positioning mechanism 50R are positioned and adjustably fixed, respectively, at the uppermost positions within the vertical positioning slots 11L, 11R. As such, the outer rotating arms 30L, 30R and inner rotating arms 20L, 20R are positioned such that the ACS 100 is at a maximum clearance height. In this raised position, the distance from the connector plate 5 to the ground is optimized for clearance of obstacles. As one of ordinary skill in the art would understand from the illustration, by adjustably fixing the vertical positioning mechanisms 50L, 50R at the uppermost point in the vertical positioning slots 11L, 11R, the inner and outer rotating arms 20, 30 are made to rotate around the pivot connections 22, 32 so that the frame of the ACS 100 is raised.

Figure 2B:
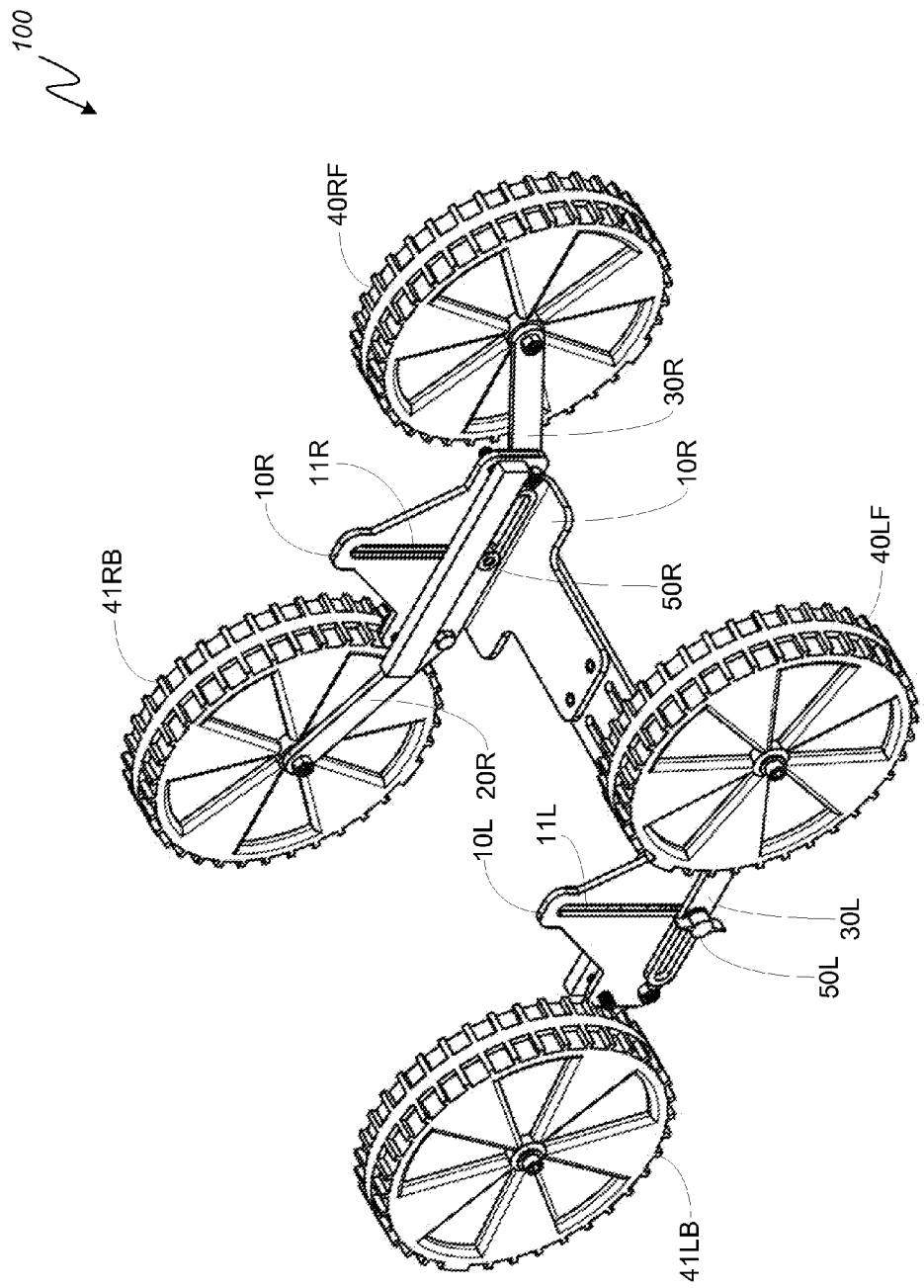
FIG. 2B is a perspective view of the exemplary embodiment of an ACS depicted in FIG. 1, shown assembled and in a lowered position.

FIG. 2B is a perspective view of the exemplary embodiment 100 of an ACS depicted in FIG. 1, shown assembled and in a lowered position relative to the ground. From the FIG. 2B illustration, it can be seen that both the left vertical positioning mechanism 50L and the right vertical positioning mechanism 50R are positioned and adjustably fixed, respectively, at the lowermost positions within the vertical positioning slots 11L, 11R. As such, the outer rotating arms 30L, 30R and inner rotating arms 20L, 20R are positioned such that the ACS 100 is at a minimum clearance height. In this lowered position, the distance from the connector plate 5 to the ground is minimized. As one of ordinary skill in the art would understand from the illustration, by adjustably fixing the vertical positioning mechanisms 50L, 50R at the lowermost point in the vertical positioning slots 11L, 11R, the inner and outer rotating arms 20, 30 are made to rotate around the pivot connections 22, 32 so that the frame of the ACS 100 is lowered.

Figure 3:
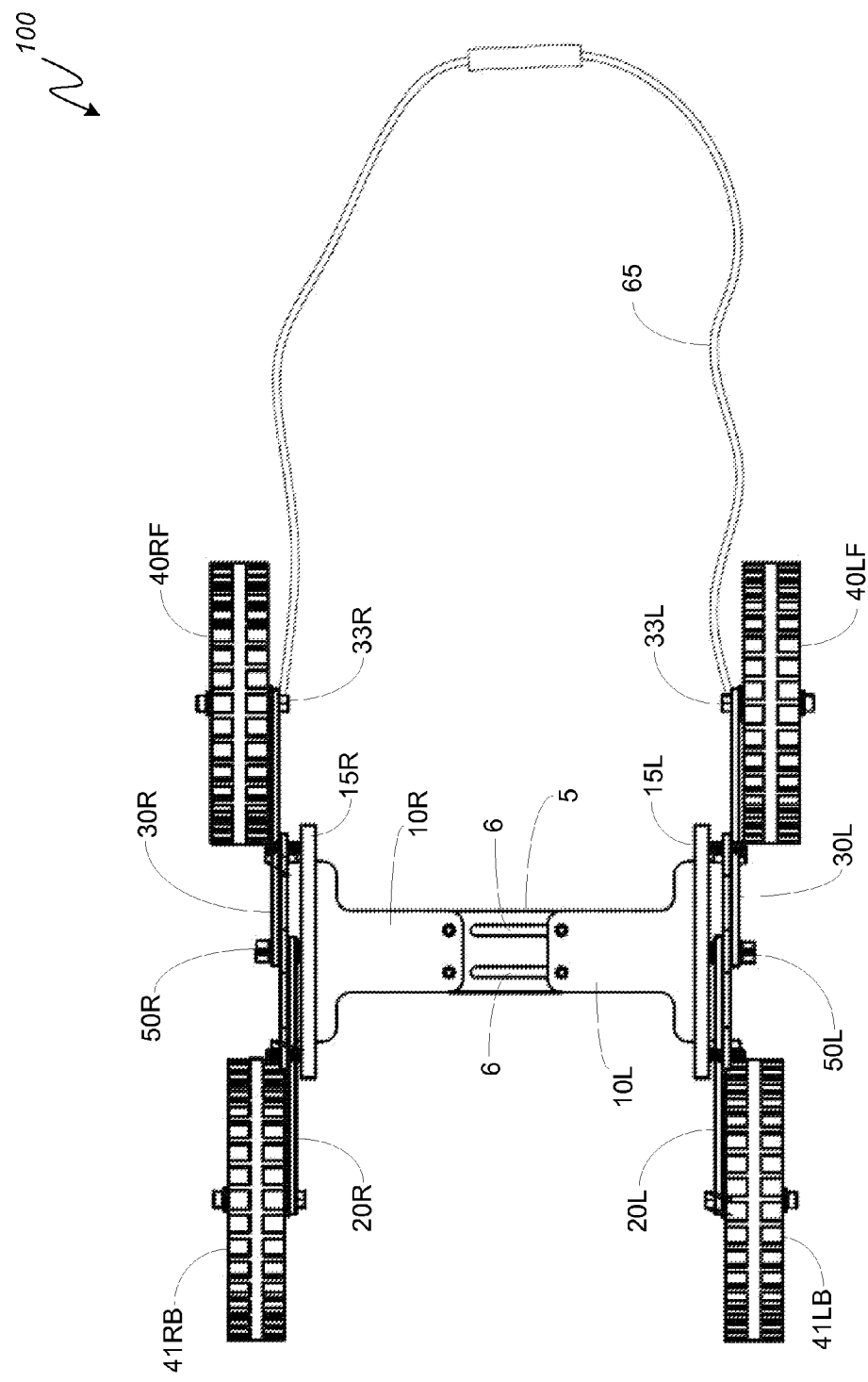
FIG. 3 depicts a top view of the exemplary embodiment of an ACS depicted in FIGS. 2A-2B.

FIG. 3 depicts a top view of the exemplary embodiment 100 of an ACS depicted in FIGS. 2A-2B. In the FIG. 3 illustration, it can be seen that in the exemplary ACS embodiment 100 the left front wheel 40LF sits slightly outside the left back wheel 41LB, by virtue of wheel 40LF being connected to the outer rotating arm 30L and wheel 41LB being connected to the inner rotating arm 20L. Similarly, the right front wheel 40RF sits slightly outside the right back wheel 41RB, by virtue of wheel 40RF being connected to the outer rotating arm 30R and wheel 41RB being connected to the inner rotating arm 20R. Advantageously, because the distance between the front wheels 40LF and 40RF is wider than the distance between the back wheels 41LB and 41RB, a pulling rope 65 or other handle/pulling means may be attached to the ACS 100 at the wheel connections 33 without interfering with a payload object (not shown). Notably, although the exemplary ACS embodiment 100 is shown with a pulling means 65 in the form of a rope, it is envisioned that other embodiments of an ACS may have different aspects useful for pulling or no pulling aspects at all. For example, it is envisioned that certain payload objects being transported by an ACS embodiment may include features useful for pulling the payload object and ACS combination and, as such, a pulling feature is not required in all embodiments of an ACS.

Figure 4A:
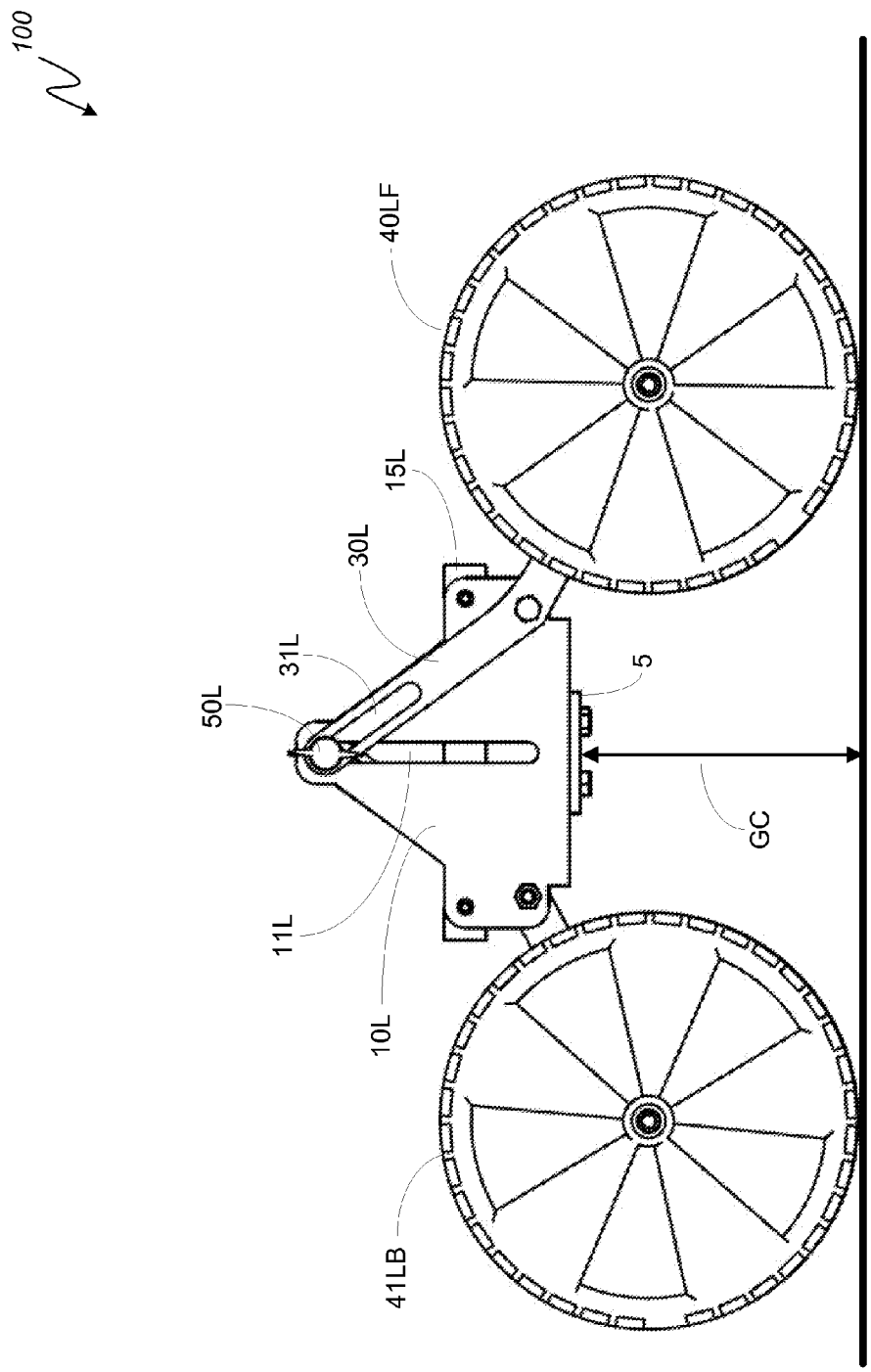
FIGS. 4A-4B depict a left-side view of the exemplary embodiment of an ACS depicted in FIGS. 2A and 2B, respectively.
Figure 4B:
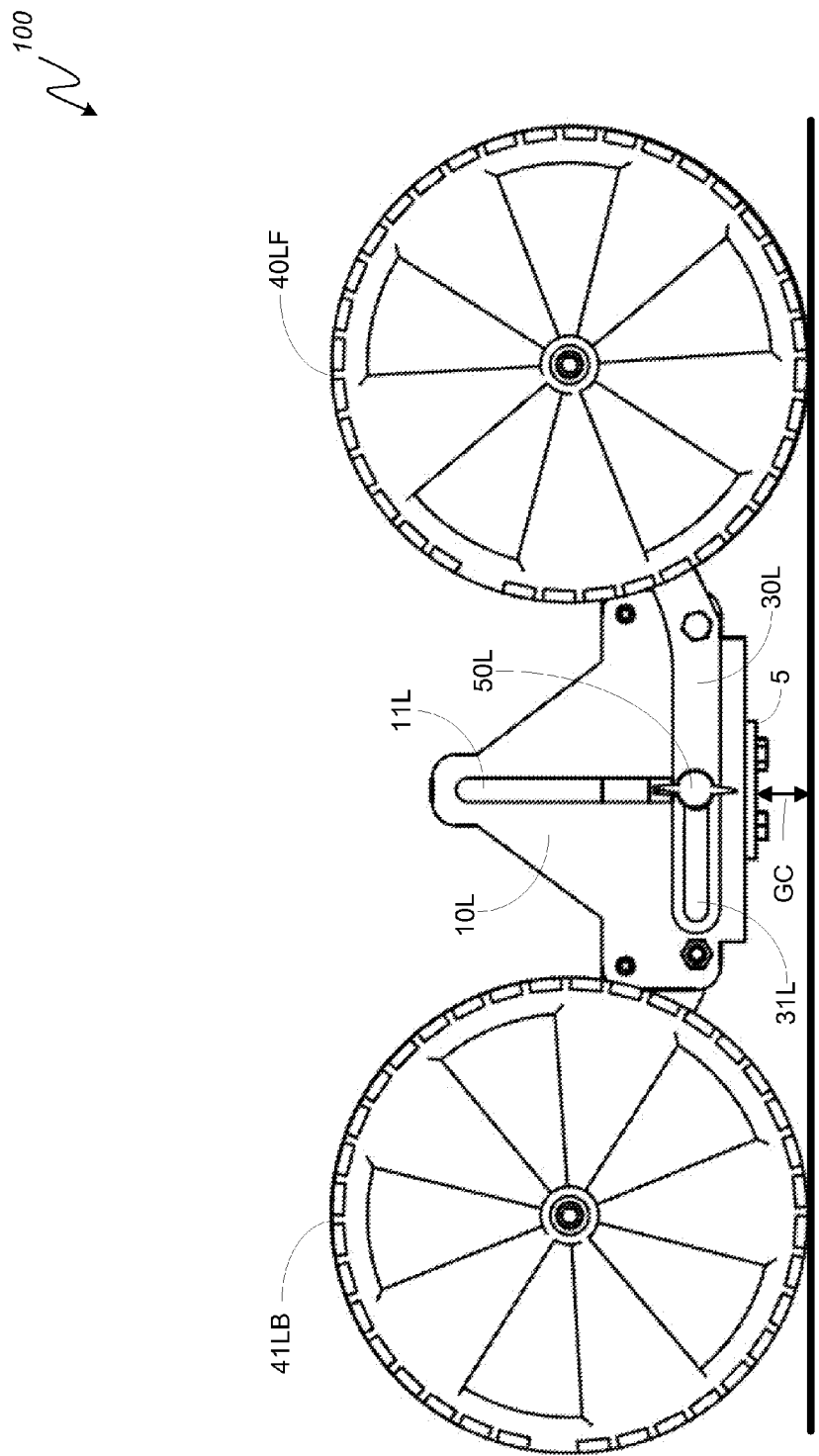

FIGS. 4A-4B depict a left-side view of the exemplary embodiment 100 of an ACS depicted in FIGS. 2A and 2B, respectively. Referring to the FIG. 4A illustration, the exemplary ACS 100 is shown in a raised position, thereby maximizing ground clearance GC. Referring to the FIG. 4B illustration, the exemplary ACS 100 is shown in a lowered position, thereby minimizing ground clearance GC. Notably, and as one of ordinary skill in the art of mechanics would understand from the Figures and related descriptions, the vertical positioning mechanisms 50 may be positioned at substantially any point along the vertical path defined by the vertical positioning slots 11 and, in doing so, set the ground clearance GC of the ACS 100 at any height between a maximum height and a minimum height. It is envisioned that some embodiments of an ACS 100 may be operable to set a minimum ground clearance GC at substantially zero, thereby allowing the ACS 100 and its payload object to "sit" on the ground. It is also envisioned that some embodiments of an ACS 100 may include wheel locks or other means for preventing one or more of the wheels 40, 41 from rolling.

Figure 5A:
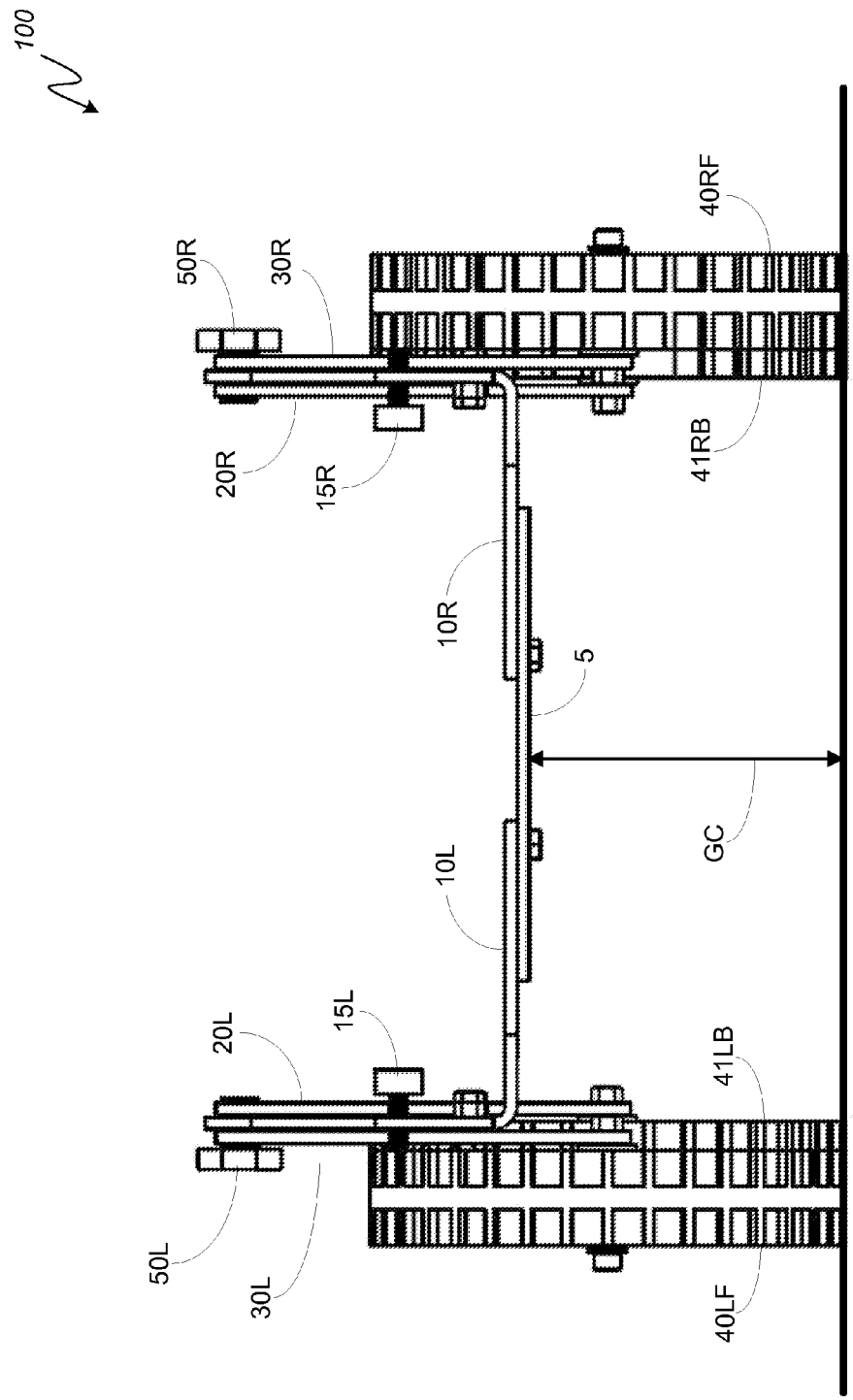
FIGS. 5A-5B depict a front view of the exemplary embodiment of an ACS depicted in FIGS. 2A and 2B, respectively.
Figure 5B:
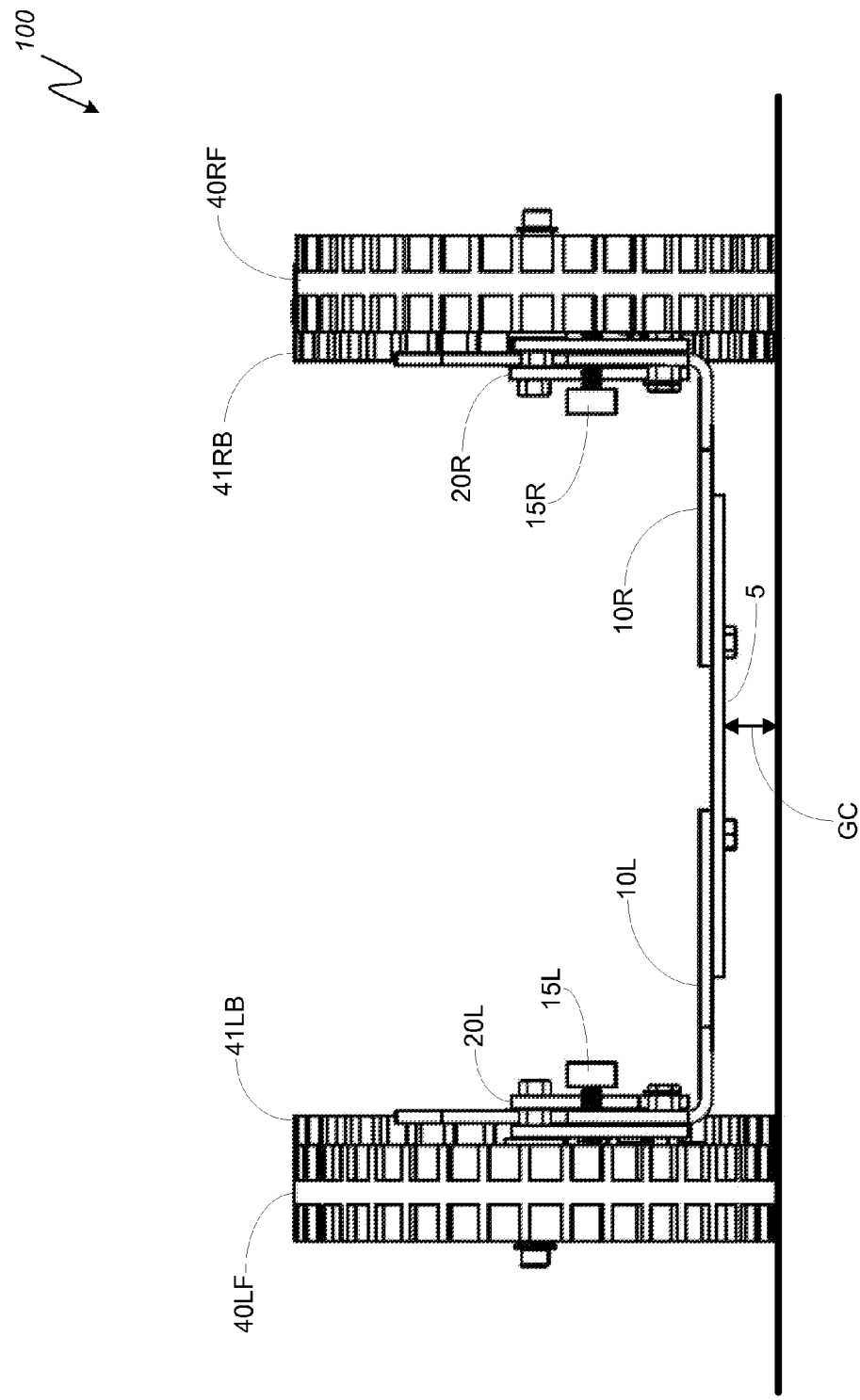

FIGS. 5A-5B depict a front view of the exemplary embodiment 100 of an ACS depicted in FIGS. 2A and 2B, respectively. Referring to the FIG. 5A illustration, the exemplary ACS 100 is shown in a raised position, thereby maximizing ground clearance GC. Referring to the FIG. 5B illustration, the exemplary ACS 100 is shown in a lowered position, thereby minimizing ground clearance GC. Advantageously, and as would be understood from the Figures and related descriptions by one of ordinary skill in the art of mechanics, the vertical positions of the frame brackets 10L, 10R relative to the associated wheels (40LF and 41LB associated with frame bracket 10L; 40RF and 41RB associated with frame bracket 10R) may be adjusted independently. As such, when the vertical positioning mechanisms SOL and 50R are adjusted to positions within the vertical positioning slots 11 that are not substantially mirrored, the ground clearance GC may vary from a low point correlating with one side of the ACS to a high point correlating with the other side of the ACS. The ability of an ACS to adjust and set the "left-side" and "right-side" ground clearance heights independently from one another will be more clearly shown and described relative to the FIG. 7 illustration.

Figure 6A:
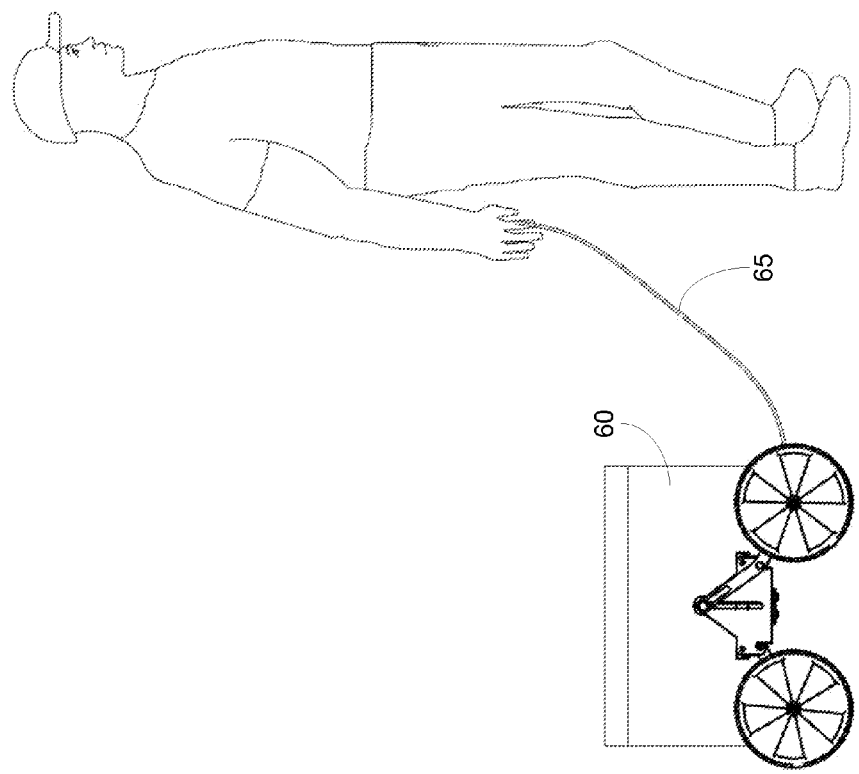
FIGS. 6A-6B illustrate the exemplary embodiment of an ACS depicted in FIGS. 2A and 2B, respectively, transporting a payload object.
Figure 6B:
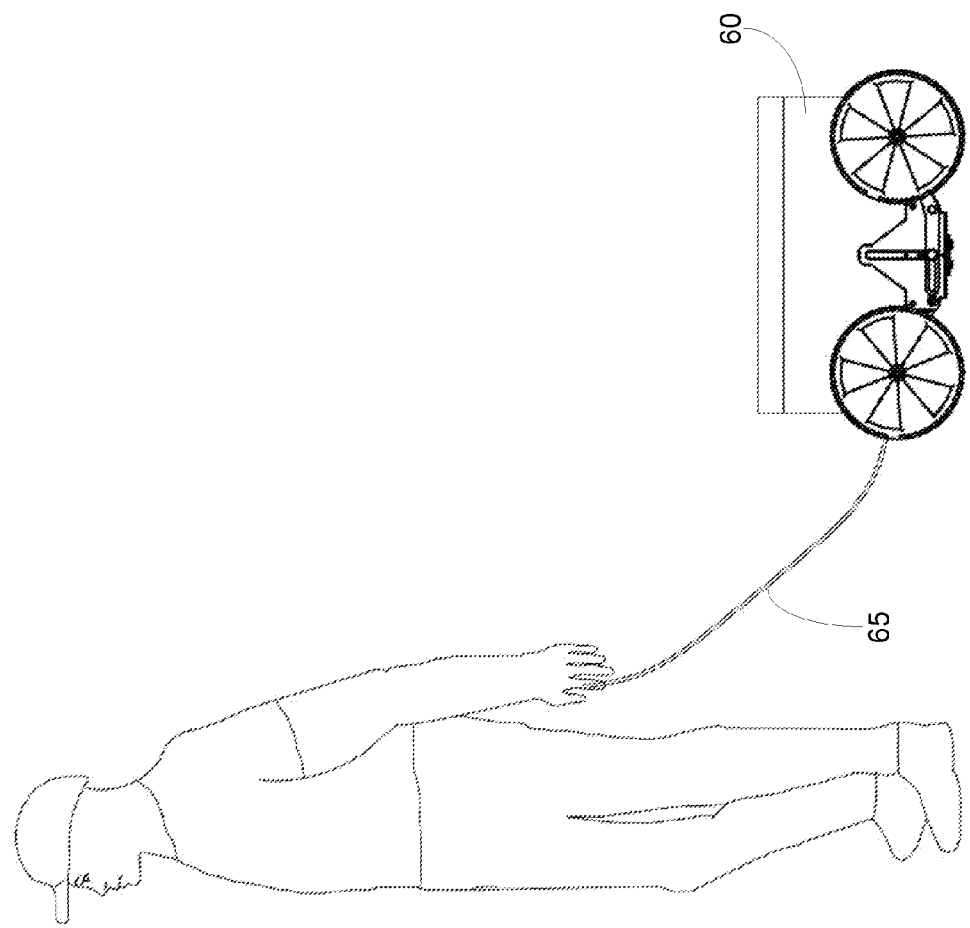

FIGS. 6A-6B illustrate the exemplary embodiment 100 of an ACS depicted in FIGS. 2A and 2B, respectively, transporting a payload object in the form of a cooler 60. Referring to the FIG. 6A illustration, the ACS 100 is in a raised position, thereby optimizing ground clearance and easing transport of the cooler 60 over rough terrain. Referring to the FIG. 6B illustration, the ACS 100 is in a lowered position, thereby minimizing ground clearance as may be preferred by the user for a particular application. Notably, in the lowered position, it is envisioned that a cooler 60 or other payload object may be stored with the ACS 100 without requiring excessive storage space. Even so, because an ACS 100 may be quickly and easily dissembled, it is envisioned that certain users may desire to remove the payload object for compact storage of the ACS 100.

Figure 7:
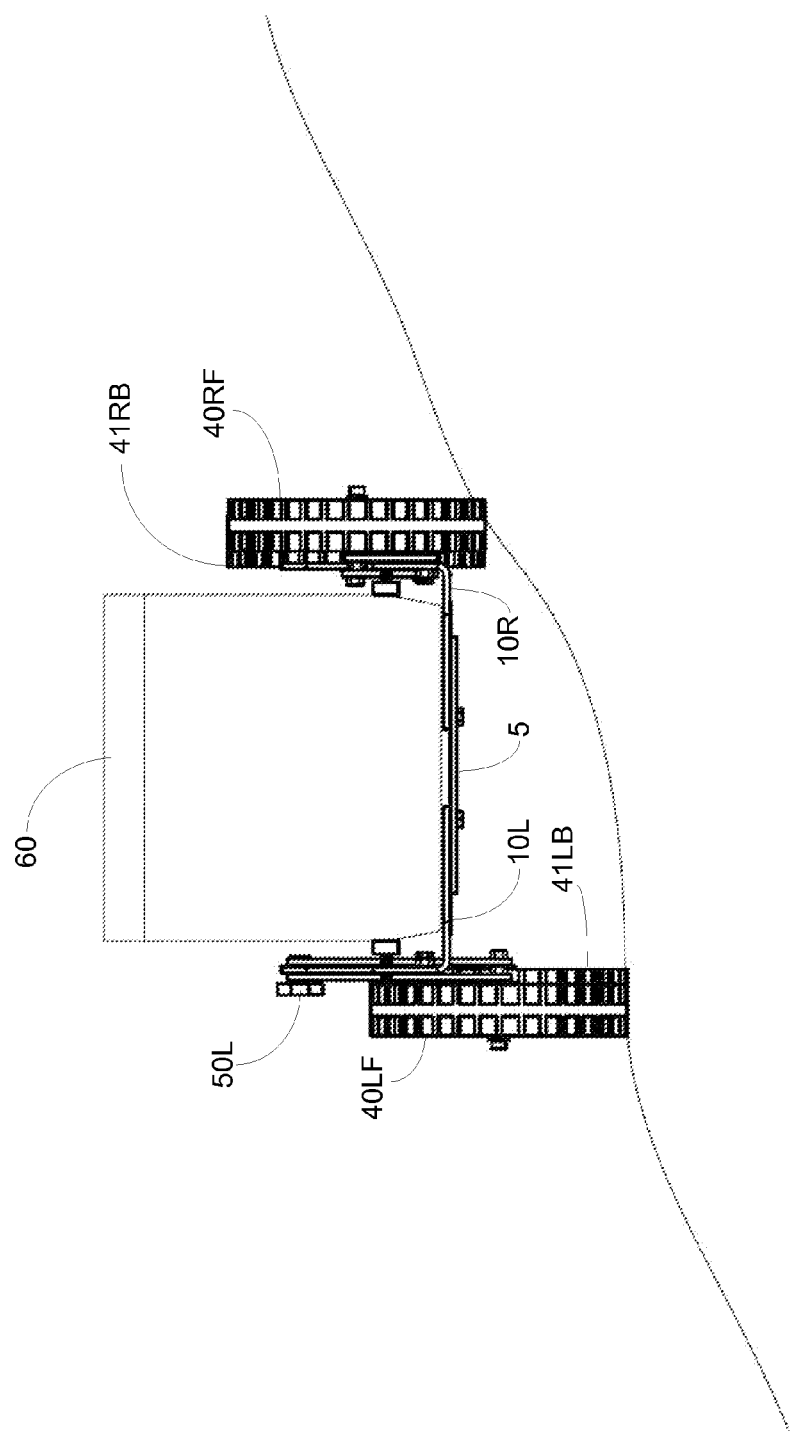
FIG. 7 depicts the exemplary embodiment of FIG. 1, shown assembled, in receipt of a payload object and adjusted on an inclined ground such that the payload object is leveled.

FIG. 7 depicts the exemplary ACS embodiment 100 of FIG. 1, shown assembled, in receipt of a cooler or gear locker payload object 60 and adjusted on an inclined ground such that the payload object 60 is leveled. As can be seen in the FIG. 7 illustration the "right-side" of the ACS 100 has been adjusted to a lowered position while the "left-side" of the ACS 100 has been adjusted to a raised position. In doing so the payload object 60 is leveled even though the ACS 100 sits on uneven ground. In this way, the ACS 100 may provide a user with means to safely transport a payload object 60 across inclined terrain without tipping or spilling the payload object 60 or its contents. Moreover, once the payload object has been relocated to a desired destination, an ACS 100 may level the payload object 60 so that it may be used as a seat, work surface, or the like.

Systems and methods of use for adjustable chassis system solutions have been described using detailed descriptions of embodiments thereof that are provided by way of example and are not intended to limit the scope of the disclosure. The described embodiments comprise different features, not all of which are required in all embodiments of an adjustable chassis system. Some embodiments of an adjustable chassis system utilize only some of the features or possible combinations of the features. Moreover, some embodiments of an adjustable chassis system may be configured to work in conjunction with specific payload objects and, as such, it will be understood that multiple instances of an adjustable chassis system, wherein each instance may utilize only some of the features or possible combinations of the features, may be reside within a single embodiment of a given adjustable chassis system. Variations of embodiments of an adjustable chassis system that are described and embodiments of an adjustable chassis system comprising different combinations of features noted in the described embodiments will occur to persons of the art.

It will be appreciated by persons skilled in the art that systems and methods of use for adjustable chassis system solutions are not limited by what has been particularly shown and described herein above. Rather, the scope of systems and methods of use for adjustable chassis system solutions is defined by the claims that follow.

What is claimed is:

1. An adjustable chassis system for transporting payload objects, the adjustable chassis system comprising:
a connector plate;
a left-side frame bracket and a right-side frame bracket, each adjustably mounted to the connector plate such that a width defined by the left-side frame bracket and right-side frame bracket is variable; and
a first left-side rotating arm and a first right-side rotating arm, wherein a first left-side wheel is mounted to the first left-side rotating arm and a first right-side wheel is mounted to the first right-side rotating arm;
wherein the first left-side rotating arm is adjustably mounted to the left-side frame bracket and the first right-side rotating arm is adjustably mounted to the right-side frame bracket such that a ground clearance height of the left-side frame bracket is adjustable independent of a ground clearance height of the right-side frame bracket.

2. The adjustable chassis system of claim 1, further comprising:
a second left-side rotating arm and a second right-side rotating arm, wherein a second left-side wheel is mounted to the second left-side rotating arm and a second right-side wheel is mounted to the second right-side rotating arm;
wherein the second left-side rotating arm is adjustably mounted to the left-side frame bracket and the second right-side rotating arm is adjustably mounted to the right-side frame bracket such that the second left-side rotating arm is adjustable in tandem with the first left-side rotating arm and the second right-side rotating arm is adjustable in tandem with the first right-side rotating arm.

3. The adjustable chassis system of claim 1, wherein the left-side rotating arm is adjustably mounted to the left-side frame bracket by way of a substantially vertical slot in the left-side frame bracket and the right-side rotating arm is adjustably mounted to the right-side frame bracket by way of a substantially vertical slot in the right-side frame bracket.

4. The adjustable chassis system of claim 1, further comprising a left-side tightening bar and a right-side tightening bar, wherein the tightening bars are operable to adjust the width defined by the left-side frame bracket and right-side frame bracket.

5. The adjustable chassis system of claim 4, further comprising a friction feature mounted to at least one of the tightening bars, wherein the friction feature operates to inhibit shifting of a payload object relative to the tightening bars.

6. The adjustable chassis system of claim 1, further comprising a pulling feature configured for translating a pulling force to the adjustable chassis system.

7. The adjustable chassis system of claim 6, wherein the pulling feature is a rope.

8. The adjustable chassis system of claim 1, further comprising a payload object removably secured within the width defined by the left-side frame bracket and right-side frame bracket.

9. The adjustable chassis system of claim 8, wherein the adjustable chassis system is configured to be pulled by a feature of the payload object.

10. The adjustable chassis system of claim 1, wherein the ground clearance heights of the left-side frame bracket and the right-side frame bracket are adjustable such that the connector plate contacts the ground.

11. An adjustable chassis system for transporting payload objects, the adjustable chassis system comprising:
a payload object operable to contain a payload;
a left-side frame bracket and a right-side frame bracket; and
a first left-side rotating arm and a first right-side rotating arm, wherein a first left-side wheel is mounted to the first left-side rotating arm and a first right-side wheel is mounted to the first right-side rotating arm;
wherein the first left-side rotating arm is adjustably mounted to the left-side frame bracket and the first right-side rotating arm is adjustably mounted to the right-side frame bracket such that a vertical height of the left-side frame bracket relative to the ground is adjustable independent of a vertical height of the right-side frame bracket relative to the ground.

12. The adjustable chassis system of claim 11, further comprising:
a second left-side rotating arm and a second right-side rotating arm, wherein a second left-side wheel is mounted to the second left-side rotating arm and a second right-side wheel is mounted to the second right-side rotating arm;
wherein the second left-side rotating arm is adjustably mounted to the left-side frame bracket and the second right-side rotating arm is adjustably mounted to the right-side frame bracket such that the second left-side rotating arm is adjustable in tandem with the first left-side rotating arm and the second right-side rotating arm is adjustable in tandem with the first right-side rotating arm.

13. The adjustable chassis system of claim 11, wherein the left-side rotating arm is adjustably mounted to the left-side frame bracket by way of a substantially vertical slot in the left-side frame bracket and the right-side rotating arm is adjustably mounted to the right-side frame bracket by way of a substantially vertical slot in the right-side frame bracket.

14. The adjustable chassis system of claim 11, further comprising a pulling feature configured for translating a pulling force to the adjustable chassis system.

15. The adjustable chassis system of claim 14, wherein the pulling feature is a rope.

16. The adjustable chassis system of claim 11, wherein the vertical heights of the left-side frame bracket and the right-side frame bracket are adjustable such that the payload object contacts the ground.

17. An adjustable chassis system for transporting payload objects, the adjustable chassis system comprising:
means for adjusting a width defined by a left-side frame bracket and a right-side frame bracket; and
means for adjusting a ground clearance height of the left-side frame bracket independently from a ground clearance height of the right-side frame bracket;
wherein a first left-side wheel is associated with the left-side frame bracket and a first right-side wheel is associated with the right-side bracket.

18. The adjustable chassis system of claim 17, further comprising a second left-side wheel associated with the left-side frame bracket and a second right-side wheel associated with the right-side frame bracket.

19. The adjustable chassis system of claim 17, further comprising a means for carrying a payload.

20. The adjustable chassis system of claim 17, further comprising a means for translating a pulling force to the adjustable chassis system.

* * * * *